United States Patent [19]
Drechsler et al.

[11] Patent Number: 5,824,147
[45] Date of Patent: *Oct. 20, 1998

[54] SILICATE COMPOUND

[75] Inventors: Andreas Drechsler, Seligenstadt; Daniel Neupert, Alzenau, both of Germany; Simon Newham, Billingshurst, England; Ingo Rademacher, Dieburg, Germany

[73] Assignee: Redland Technologies Limited, England

[ * ] Notice: This patent issued on a continued prosecution application filed under 37 CFR 1.53(d), and is subject to the twenty year patent term provisions of 35 U.S.C. 154(a)(2).

[21] Appl. No.: 722,156

[22] PCT Filed: Mar. 11, 1995

[86] PCT No.: PCT/DE95/00346

§ 371 Date: Feb. 20, 1997

§ 102(e) Date: Feb. 20, 1997

[87] PCT Pub. No.: WO95/29139

PCT Pub. Date: Nov. 2, 1995

[30] Foreign Application Priority Data

Apr. 22, 1994 [DE] Germany .................... 44 13 996.9

[51] Int. Cl.⁶ .................................................. C04B 14/04
[52] U.S. Cl. .................... 106/600; 106/624; 106/626; 106/632; 106/635; 106/737
[58] Field of Search ...................... 106/600, 602, 106/624, 626, 632, 635, 638, 737

[56] References Cited

U.S. PATENT DOCUMENTS

| | | | |
|---|---|---|---|
| 637,211 | 11/1899 | Lawton et al. .................... | 106/635 |
| 3,827,869 | 8/1974 | Von Bonin ........................ | 106/602 |
| 3,977,888 | 8/1976 | Sato et al. ........................ | 106/629 |
| 4,117,197 | 9/1978 | Krejci . | |
| 4,185,141 | 1/1980 | Krejci . | |
| 4,235,836 | 11/1980 | Wassell et al. .................... | 106/624 |
| 4,277,355 | 7/1981 | Farcnik .............................. | 106/602 |
| 4,318,743 | 3/1982 | Blasko et al. ..................... | 106/632 |
| 4,451,294 | 5/1984 | Popov et al. ................. | 106/DIG. 1 |
| 4,608,795 | 9/1986 | Neuschaeffer et al. ........... | 106/624 |
| 5,082,494 | 1/1992 | Crompton ......................... | 106/600 |
| 5,518,535 | 5/1996 | Boaz ................................. | 106/635 |
| 5,583,079 | 12/1996 | Golitz et al. ................ | 106/DIG. 1 |

FOREIGN PATENT DOCUMENTS

| | | | |
|---|---|---|---|
| 2060155 | 6/1971 | Germany ........................... | 106/626 |
| 0005396 | 2/1970 | Japan ................................. | 106/600 |
| 0127422 | 10/1979 | Japan ................................ | 106/626 |
| 0587124 | 1/1978 | U.S.S.R. ........................... | 106/600 |
| 1076408 | 2/1984 | U.S.S.R. ........................... | 106/600 |

*Primary Examiner*—Paul Marcantoni
*Attorney, Agent, or Firm*—Rothwell, Figg, Ernst & Kurz, P.C.

[57] ABSTRACT

The invention relates to a silicate compound having at least one alkaline oxide and silicon dioxide-containing amorphous binder matrix and also containing oxides from the aluminum, calcium, titanium, magnesium, zirconium, and/or boric oxide group. To provide a silicate compound which is suitable for both making a moulding and coating a substrate, resistant to effects like weathering, especially through alternate frost and thaw, and attack by acids, lyes or fouling, it is proposed that the amorphous binder matrix contain 4 to 25 mol silicon dioxide per mol alkaline oxide, the alkaline oxide being lithium, sodium, and/or potassium oxide and the amorphous binder matrix also contains up to 80 mol aluminum oxide and/or up to 45 mol calcium, titanium, magnesium, zirconium, and/or boric oxide evenly distributed per 100 mol silicon dioxide.

50 Claims, No Drawings

SILICATE COMPOUND

DESCRIPTION

The invention relates to a silicate compound having at least one amorphous binder matrix containing alkali oxide and silicon dioxide, and also containing oxides from the group aluminium oxide, calcium oxide, titanium dioxide, magnesium oxide, zirconium dioxide and/or boric oxide.

Such a silicon compound can be used to coat building elements, in particular roof tiles. The surface of concrete roof tiles, i.e. rooftiles made of concrete, is coated to avoid efflorescence and to achieve an aesthetic appearance. With the passage of time the coating of a roof tile is exposed to severe corrosion from the elements. While in summer under strong solar radiation the surface temperature can rise to up to about 80°, in winter under frost conditions it can fall to −30°. Of critical importance is corrosion by freeze-thaw cycles and by acid rain. Concrete roof tiles are usually protected with a coating of plastic dispersion paint.

The drawback of such plastic coatings is that the coating does not have long-term resistance to ultraviolet radiation in particular, and therefore disintegrates after a few years.

From DE-25 39 718 B2 a process is known for coating preformed building components based on inorganic binders containing customary aggregates with glaze-like silicate and/or phosphate-containing coverings, whereby a plastic mix is produced from the inorganic binder and water and customary aggregates, which mix is shaped into building components onto which is applied a thin layer of an aqueous paste containing water glass and/or phosphates and metal oxides and possibly pigments and fillers, which layer is then cured, whereby soluble inorganic salts in a minimum quantity of 0.5% by weight related to the inorganic binder, or in the case of sand-lime bricks related to the binder plus aggregates, are blended into the mix, which salts transform the aqueous paste, which is applied to the preformed building component at the rate of 190 to 400 g per m², into a gel-like, non-flowing state, whereupon the preformed building component as well as the coating are cured. For the purposes of coating, aqueous, alkaline pastes are applied with 42 to 63 % mol $SiO_2$, 11 to 27 % mol alkali oxide and between 19 and 42% mol metal oxide, related to the total weight of these constituents. As metal oxides ZnO, MgO, PbO, CaO, $B_2O_3$ and/or $Al_2O_3$ for example are added to the paste.

Alternately combining the top and bottom limits results purely arithmetically in a mol ratio of silicon dioxide to alkali oxide of between 1.56 and 3.82. However, the description and the examples of embodiment only mention the use of water glass of 37° to 40° Be in which the silicon dioxide/alkali oxide mol ratio is a maximum of 3.52. In order to transform such a paste into a gel-like, non-flowing state it is necessary to add soluble inorganic salts, which addition is the mandatory characteristic included in the main claim of DE-25 39 718 B2. In accordance with the process described here the paste is applied to the preformed building component and, together with the latter, is cured either in the autoclave under pressure at high temperatures or in a purely thermal treatment at normal pressure.

An inorganic silicate coating is known from EP 0 247 910, in which the binder matrix contains in relation to solids approx. 100 parts by weight potassium silicate, approx. 10 to 40 parts by weight fine particles of silicon dioxide and approx. 15 to 100 parts by weight nacreous lustre pigment. When using water glass with a silicon dioxide/alkali oxide mol ratio of 3.95, the mol ratio of silicon dioxide to alkali oxide in the coating may be up to 6.15. As a method for the production of a coated object, EP 0 247 910 B1 states that the coating compound is applied to the substrate and must then for purposes of curing be heated with this substrate to a temperature of approx. 200° C. to approx. 400° C. The nacreous lustre pigment is contained in the coating in the form of particles which are surrounded by the binder matrix. No indication can be found in EP 0 247 910 regarding the addition of further oxidic constituents.

The purpose of this invention is to create a shaped body as well as a silicate compound free of organic substances, which forms a coating of a substrate, which silicate compound is resistant to weathering, particularly to freeze-thaw cycles, and to attacks by acids, lyes or vegetal growth. It ought to be possible to apply the coating to a substrate by simple methods, e.g. brushing, rolling, pouring or spraying, and to cure it at a temperature of less than 200° C., preferably less than 100° C.

The problem is solved by the invention in that the amorphous binder matrix contains 4 to 25 mol of silicon dioxide per mol of alkali oxide, that the alkali oxide consists of lithium, sodium and/or potassium oxide and that the amorphous binder matrix moreover contains, homogenously distributed per 100 mol of silicon dioxide, up to 80 mol of aluminium oxide and/or up to 45 mol of calcium oxide, titanium dioxide, magnesium oxide, zirconium dioxide and/or boric oxide.

Where alkali or other oxides are mentioned here, this corresponds to the designation of metal contents as oxides which is usual in silicate analysis, even if these are actually present in the form of chemical compounds such as silicates, aluminates or similar compounds.

The binder matrix contains a very high proportion of silicon dioxide, namely 4 to 25 mol of silicon dioxide per mol of alkali oxide. Therefore the silicate compound as per the invention is highly resistant to the corrosion mentioned in the problem definition yet can be applied in the form of an aqueous silicate suspension to a roof tile. The silicate suspension hardens on the roof tile at a temperature of less than 100° into a solid silicate compound forming a coating. This is important in particular for use on a concrete roof tile, as hardening can also proceed at room temperature.

The content of up to 80 mol of aluminium oxide per 100 mol of silicon dioxide causes the silicate compound to acquire a particularly high chemical resistance. Contents of up to 45 mol of calcium oxide, titanium dioxide, magnesium oxide, zirconium oxide and/or boric oxide per 100 mol of silicon dioxide also increase the resistance of the silicate compound. The addition of the foregoing substances increases both the hydrolytic resistance of the silicate compound as well as its resistance to corrosion by alkalis in particular and corrosion by acids, for instance acid rain. Aluminum and calcium are particularly effective.

It is advantageous to produce the silicate compound from an alkaline silica sol with a solids content of 30 to 70% by weight. The alkaline silica sol should have a mean particle size of less than 130 nm.

Production of the silicate compound from an alkaline silica sol with this particle size offers the particular advantage that a highly homogenous binder matrix is obtained from the silicon dioxide and alkali sources. In this way it is possible to achieve in the binder matrix of the hardened silicate compound a structure which correspond to that of glass. Thus a glassy silicate compound can be produced at temperatures of less than 100° C.

Owing to the low temperature during production, it is possible to produce large shaped bodies which have high dimensional stability and are free of temperature stresses.

A particularly crack-free silicate compound with a smooth surface is obtained if the binder matrix contains a crystalline filler from the class of layer silicates. The filler can for instance consist of mica or also of a mixture of different layer silicates.

A particularly smooth and shiny surface of the silicate compound is obtained if the binder matrix contains a crystalline filler from the calcite category.

The silicate compound can contain moreover slag sand and/or cement. Glassy blast-furnace slag is designated as slag sand. During production, the slag sand or cement, after incorporation in the aqueous solution, is at least etched on the surface if not completely dissolved so that their constituents are distributed homogeneously in the binder matrix.

The silicate compound can moreover (contain) glass powder with a calcium oxide content of at least 30% by wt., an $SiO_2$ content of less than 70% by wt. and an aluminium oxide content of less than 20% by wt. Like slag sand or cement, the glass powder is dissolved after incorporation in the aqueous solution.

The silicate compound can contain colouring pigments to adjust it to a desired colour.

The silicate compound can be used as protection against weathering if it is applied as a coating on a substrate. The substrate can for instance be a roof tile.

The thickness of the silicate compound applied as a coating can be on average between 0.02 and 2 mm (20 nm and 2mm), preferably about 0. 1 mm.

The silicate suspension for coating a roof tile can be produced on the basis of an aqueous alkaline silicate solution with a silicon dioxide/alkali oxide mol ratio of less than 2 if the silicate solution is mixed, for example with silica sol or with another of the aforementioned substances with a high silicon oxide content, in order to increase the silicon dioxide proportion. Preference is given to a silicate solution containing potassium, but one containing lithium or sodium or a mixture of these can also be used. If the silicon dioxide content is increased by adding silica sol, a chemically very pure silicate compound results after hardening. An excellent-value silicate compound can be obtained by using fly ash.

Obviously a solution of a pure alkali silicate or mixtures of the same can also be used, or silicic acid or substances with high silicon dioxide contents can be dissolved in caustic soda or caustic potash lye.

For coating a substrate the silicate suspension can be applied by brushing, rolling, pouring or preferably spraying. During subsequent drying the aqueous silicate suspension hardens into a silicate compound which forms the coating. Fresh or cured concrete, metal or a mineral body are examples of substrate. Even porous surfaces are sealed with a closed film.

The silicate compound as per the invention is excellently suited for coating granules, sands or fillers.

The silicate suspension is practically suitable for all applications where cement-bonded binders are used at present, for instance for grouting joints or gluing building materials.

Moreover, the silicate suspension can be used for decorative or ornamental purposes. Differently coloured silicate suspensions can be used to achieve a marbling effect in the silicate compound.

The production of silicate compounds as per the invention with varying compositions and application of the same is described below using twelve examples of embodiment.

Example of embodiment 1

600 g of potassium silicate solution with a solids content of 45% by wt. and a silicon dioxide/alkali oxide mol ratio of 1.3 was added within 3 minutes by stirring to 1440 g of an aqueous alkali silica sol with a solids content of 30% and a mean particle size of 40 nm. After addition of the potassium silicate solution the mix was dispersed for 5 minutes. The silicon dioxide/alkali oxide mol ratio was then 5.8. The preparation was then stored for 4 days in a sealed polyethylene vessel at room temperature; 756 g of mica with a mean particle size of 36 $\mu$m together with 216 g of an aqueous pigment suspension with 61.5% by wt. of iron oxide pigment and a mean particle size of 0.1 $\mu$m were then added and the mix dispersed for 5 minutes at 1000 rpm. The aqueous silicate suspension was then sprayed onto the exposed surface of a newly-cured concrete roof tile and dried at room temperature for 1 hour. The concrete roof tile had a matt red coating with a mean thickness of 0.1 mm.

Example of embodiment 2

80 g of pure potassium metaborate was added to 400 g of an alkaline potassium silicate solution with a solids content of 45% by weight and a silicon dioxide/alkali oxide mol ratio of 1.3; this suspension was heated up to 80° C. until a clear solution developed and this was then cooled to room temperature. The cooled solution was stirred into 1400 g of an aqueous alkaline silica sol with a solids content of 30% by wt. and a mean particle size of 40 nm. The silicon dioxide/alkali oxide mol ratio was then 5.9. The entire preparation was dispersed and 40 g of amorphous aluminium oxide with a mean particle size of less than 13 nm was added. The aluminium oxide content was 4.7 mol per 100 mol silicon dioxide. The mixture was then dispersed and stored for one day in a sealed polyethylene vessel at room temperature; 624 g of mica with a mean particle size of 36 $\mu$m together with 93.6 g of an aqueous pigment suspension with 61.5% by weight of iron oxide pigment and a mean particle size of 0.1 $\mu$m were then added. After dispersing the silicate suspension was then applied with a paint brush to the exposed surface of a cured concrete roof tile and dried at room temperature for 24 hours. The coated concrete roof tile was then heated for 2 hours at 120° C. The concrete roof tile had a matt red coating with a mean thickness of 0.1 mm.

Example of embodiment 3

150 g of an alkaline potassium silicate solution with a solids content of 45% by wt. and a silicon dioxide/alkali oxide mol ratio of 1.3 were placed in a metal beaker. 330 g of melting chamber fly ash with a high amorphous proportion was stirred in and this suspension was dispersed for a short time. The melting chamber fly ash had the following constituents by weight calculated as oxides: silicon dioxide 46%, aluminium oxide 30%, calcium oxide 5.3%, magnesium oxide 3.5%, potassium oxide 5.0% and sodium oxide 1.0%. After dispersing, 50 g of amorphous aluminium oxide with a mean particle size of 13 nm and 45 g iron oxide pigment with a mean particle size of 0.1 $\mu$m were stirred in. After intensive stirring for the purpose of homogenisation, 60 g of water was added. The silicon dioxide/alkali oxide mol ratio was now 4.9 and the aluminium oxide content 49 mol per 100 mol silicon dioxide. The proportion of the additional oxides of calcium and magnesium was 20 mol per 100 mol silicon dioxide. The resultant silicate suspension was immediately sprayed on to the exposed surface of a newly-cured concrete roof tile and dried for one hour at room temperature. The concrete roof tile had a matt red coating with a mean thickness of 0.1 mm.

Example of embodiment 4

5 g of sodium tetraborate-10-hydrate (p.a.) was stirred into 100 g of an alkaline potassium silicate solution at 80° C. with a solids content of 45% by wt. and a silicon dioxide/alkali oxide mol ratio of 1.3. Stirring was continued until a clear solution developed. After cooling to room temperature the solution was stirred into 180 g of an aqueous alkaline silica sol with a solids content of 30% by wt. and a mean particle size of 40 μm. The mix was then stirred for 5 minutes. The silicon dioxide/alkali oxide mol ratio was now 4.4 and the boron oxide content was 2 mol per 100 mol of silicon dioxide. After storage for 4 days in a sealed polyethylene vessel at room temperature the silicate suspension was applied with a paint brush to the exposed surface of a cured concrete rooftile, and dried for one hour at room temperature. The concrete roof tile had a colourless, transparent, slightly shiny coating with a mean thickness of 0.1 mm.

Example of embodiment 5

20 g of pure potassium metaborate was added to 100 g of an aqueous potassium silicate solution with a solids content of 45% by wt. and a silicon dioxide/potassium oxide mol ratio of 1.3, this suspension was heated up to 80° C. until a clear solution developed. After cooling to room temperature, the solution was stirred into 740 g of an aqueous alkaline silica sol with a mean particle size of 40 nm and a solids content of 30% by wt. Stirring was continued for 5 minutes and the preparation then stored for one day in a sealed polyethylene vessel at room temperature. The silicon dioxide/alkali oxide mol ratio was then 11.5 and the boric oxide content 2 mol per 100 mol of silicon dioxide. 273 g of mica with a mean particle size of 36 μm together with 43 g of an aqueous pigment suspension with 61.5% by wt. iron oxide pigment with a mean particle size of 0.1 μm were then added. This mixture was then dispersed for 5 minutes. The prepared silicate suspension was then applied with a paint brush to the exposed surface of a precured concrete rooftile. Drying was effected for one day at room temperature and then for one hour at 190° C. The concrete roof tile had a matt red coating with a mean thickness of 0.1 mm.

Example of embodiment 6

100 g of pure potassium metaborate was added to 200 g of a 5.6 molar caustic soda lye. The suspension was then heated to 80° C. while stirring until a clear solution developed. After cooling to room temperature the solution was stirred into 827 g of silica sol with a solids content of 30% by wt. and a mean particle size of 40 nm. The resultant mixture was dispersed for 5 minutes and then stored for one day in a polyethylene vessel at room temperature. The silicon dioxide/alkali oxide mol ratio was 4.2. The boric oxide proportion was 11 mol per 100 mol of silicon dioxide. 413 g of mica with a mean particle size of 36 μm and 105 g of an aqueous pigment suspension with a content of 61.5% by wt. iron oxide pigment with a mean particle size of 0.1 μm were then stirred into the dissolver. This mixture was then dispersed for 5 minutes. The prepared silicate suspension was applied with a paint brush on the exposed side of a precured concrete roof tile and dried for one hour at room temperature. The concrete roof tile had a matt red coating with a mean thickness of 0.1 mm.

Example of embodiment 7

150 g of an alkaline potassium silicate solution with a solids content of 45% by wt. and a silicon dioxide/alkali oxide mol ratio of 1.3 was placed in a metal beaker. While stirring, 330 g of melting chamber fly ash with a high amorphous proportion was added and this suspension was dispersed for a short time. The melting chamber fly ash had the following constituents by weight calculated as oxides: silicon dioxide 46%, aluminium oxide 30%, calcium oxide 5.3%, magnesium oxide 3.5%, potassium oxide 5.0% and sodium oxide 1.0%. After dispersing, 30 g of amorphous aluminium oxide with a mean particle size of 13 nm and 45 g of iron oxide pigment with a mean particle size of 0.1 μm were stirred in. After intensive stirring for the purpose of homogenisation, 60 g of water was added. The silicon dioxide/alkali oxide mol ratio was now 4.9 and the aluminum oxide content 42 mol per 100 mol of silicon dioxide. The proportion of the additional calcium and magnesium oxides was 20 mol per 100 mol silicon dioxide. The resultant silicate suspension was immediately poured on the exposed surface of a newly cured concrete roof tile and dried for one day at room temperature. The concrete roof tile had a matt coating with a mean thickness of 1 mm.

Example of embodiment 8

133 g of a 5 molar potassium lye was added to 467 g of an aqueous alkali silica sol with a solids content of 60% and a mean particle size of 40 nm. The alkali silicate solution obtained was then dispersed for 5 minutes. The $SiO_2$,alkali oxide mol ratio was now 15.5. The preparation was then stored in a sealed polyethylene vessel at room temperature for about 1 hour. 60 g of pigment with a mean particle size of 0.1 μm were then added. The mixture obtained was dispersed for 5 minutes. Then 105 g of slag sand followed by a mixture of 84 g mica with a mean particle size of 36 μm and 126 g calcite with a mean particle size of 20 μm were stirred in. This mixture was finally homogenised and the resultant silicate suspension was cast into disk-shaped bodies with a diameter of 40 mm, a height of 4 mm and a weight of 15 g. These shaped bodies were cured within two days at room temperature. The shaped bodies showed no cracks of any kind and had a shiny surface.

Example of embodiment 9

60 g of water was added to the silicate suspension described in example 8 and dispersed. The diluted silicate suspension was then sprayed onto a freshly fired clay roof tile and dried for one day at room temperature. The resultant coated clay roof tile had a coating with a mean thickness of 0.1 mm and a shiny surface.

Example of embodiment 10

115 g of a 5 molar potassium lye was added to 750 g of an aqueous alkaline silica sol with a solids content of 50% and a mean particle size of 50 nm. The resultant alkali silicate solution was then dispersed for 5 minutes. The $SiO_2$/alkali oxide mol ratio was now 23. The preparation was then stored in a sealed polyethylene vessel for about half an hour at room temperature. 86.5 g of a red iron oxide pigment with a mean particle size of 0.1 μm was then added. The resultant mixture was dispersed for 5 minutes. 150 g of slag sand followed by 303 g of mica with a mean particle size of 36 μm were then stirred in. This mixture was finally homogenised. The resultant silicate suspension was immediately applied by paint brush to the exposed surface of a freshly cured concrete roof tile. The concrete roof tile obtained in this way was dried for one day at room temperature. The concrete roof tile had a red coloured coating with a mean thickness of 0.1 mm.

Example of embodiment 11

145 g of an alkaline potassium silicate solution with a solids content of 45% by wt. and a silicon dioxide/alkali oxide mol ratio of 1.3 was added to 255 g of a freshly produced aqueous alkaline silica sol with a solids content of 60% and a mean particle size of 40 nm and dispersed for 15 minutes. The silicon dioxide/alkali oxide mol ratio was now 7.9. 40 g of pigment with a mean particle size of 0.1 μm followed by 70 g of slag sand were then quickly stirred into this preparation. The resultant mixture was dispersed before the addition of 140 g of mica with a mean particle size of 36 μm. Finally 40 g of water was added and the preparation homogenised. The aqueous silicate suspension was then sprayed onto the exposed surface of a freshly produced, uncured concrete roof tile and cured with it for 6 hours at 60° C. The concrete roof tile obtained had a coating with a mean thickness of about 0.1 mm.

Example of embodiment 12

The aqueous silicate suspension produced in accordance with example 11 was applied with a paint brush to one degreased glass plate and one metal plate. These samples were dried for several hours at room temperature. The glass and metal plates obtained had a crack-free, firmly adhering coating with a mean thickness of 0.3 mm.

We claim:

1. A coating composition consisting of silicon dioxide, alkali oxide selected from the group consisting of lithium oxide, potassium oxide, sodium oxide and mixtures thereof and one or more oxides selected from the group consisting of aluminum oxide, calcium oxide, titanium dioxide, magnesium oxide, zirconium dioxide and boric oxide, wherein the mol ratio of silicon dioxide to alkali oxide is 4–25:1, the mol ratio of aluminum oxide to silicon dioxide is 0–0.8:1, the mol ratio of calcium oxide to silicon dioxide is 0–0.45:1, the mol ratio of titanium dioxide to silicon dioxide is 0–0.45:1, the mol ratio of magnesium oxide to silicon dioxide is 0–0.45:1, the mol ratio of zirconium dioxide to silicon dioxide is 0–0.45:1 and the mol ratio of boric oxide to silicon dioxide is 0–0.45:1, and wherein said composition hardens at a temperature less than 100° C.

2. The coating composition of claim 1, wherein said composition is produced from an alkali silica sol with a solids content of 30–70% by weight.

3. The coating composition of claim 2, wherein said alkali silica sol has a mean particle size of less than 130 nm.

4. The coating composition of claim 1 which further comprises a crystalline layer silicate filler.

5. The coating composition of claim 2 which further comprises a crystalline layer silicate filler.

6. The coating composition of claim 3 which further comprises a crystalline layer silicate filler.

7. The coating composition of claim 1 which further comprises a crystalline calcite filler.

8. The coating composition of claim 2 which further comprises a crystalline calcite filler.

9. The coating composition of claim 3 which further comprises a crystalline calcite filler.

10. The coating composition of claim 1 which further comprises a filler selected from the group consisting of blast furnace slag, cement and mixtures thereof.

11. The coating composition of claim 2 which further comprises a filler selected from the group consisting of blast furnace slag, cement and mixtures thereof.

12. The coating composition of claim 3 which further comprises a filler selected from the group consisting of blast furnace slag, cement and mixtures thereof.

13. The coating composition of claim 1 which further comprises a glass powder comprising a calcium oxide content of at least 30% by weight, a silicon dioxide content of less than 70% by weight and an aluminum oxide content of less than 20% by weight.

14. The coating composition of claim 2 which further comprises a glass powder comprising a calcium oxide content of at least 30% by weight, a silicon dioxide content of less than 70% by weight and an aluminum oxide content of less than 20% by weight.

15. The coating composition of claim 3 which further comprises a glass powder comprising a calcium oxide content of at least 30% by weight, a silicon dioxide content of less than 70% by weight and an aluminum oxide content of less than 20% by weight.

16. The coating composition of claim 1 which further comprises coloring pigments.

17. The coating composition of claim 2 which further comprises coloring pigments.

18. The coating composition of claim 3 which further comprises coloring pigments.

19. The coating composition of claim 1 applied as a coating to a substrate.

20. The coating composition of claim 19, wherein the substrate is a roof tile.

21. The coating composition of claim 20, wherein said coating when hardened on the substrate has a thickness of on average between 20 μm and 2 mm.

22. The coating composition of claim 20, wherein said thickness is 0.1 mm.

23. The coating composition of claim 2 applied as a coating to a substrate.

24. The coating composition of claim 23, wherein the substrate is a roof tile.

25. The coating composition of claim 24, wherein said coating when hardened on the substrate has a thickness of on average between 20 μm and 2 mm.

26. The coating composition of claim 24, wherein said thickness is 0.1 mm.

27. The coating composition of claim 3 applied as a coating to a substrate.

28. The coating composition of claim 27, wherein the substrate is a roof tile.

29. The coating composition of claim 28, wherein said coating when hardened on the substrate has a thickness of on average between 20 μm and 2 mm.

30. The coating composition of claim 28, wherein said thickness is 0.1 mm.

31. The coating composition of claim 4 applied as a coating to a substrate.

32. The coating composition of claim 31, wherein the substrate is a roof tile.

33. The coating composition of claim 32, wherein said coating when hardened on the substrate has a thickness of on average between 20 μm and 2 mm.

34. The coating composition of claim 32, wherein said thickness is 0.1 mm.

35. The coating composition of claim 7 applied as a coating to a substrate.

36. The coating composition of claim 35, wherein the substrate is a roof tile.

37. The coating composition of claim 36, wherein said coating when hardened on the substrate has a thickness of on average between 20 μm and 2 mm.

38. The coating composition of claim 36, wherein said thickness is 0.1 mm.

39. The coating composition of claim 10 applied as a coating to a substrate.

40. The coating composition of claim 39, wherein the substrate is a roof tile.

41. The coating composition of claim 40, wherein said coating when hardened on the substrate has a thickness of on average between 20 μm and 2 mm.

42. The coating composition of claim 40, wherein said thickness is 0.1 mm.

43. The coating composition of claim 13 applied as a coating to a substrate.

44. The coating composition of claim 43, wherein the substrate is a roof tile.

45. The coating composition of claim 44, wherein said coating when hardened on the substrate has a thickness of on average between 20 μm and 2 mm.

46. The coating composition of claim 44, wherein said thickness is 0.1 mm.

47. The coating composition of claim 16 applied as a coating to a substrate.

48. The coating composition of claim 47, wherein the substrate is a roof tile.

49. The coating composition of claim 48, wherein said coating when hardened on the substrate has a thickness of on average between 20 μm and 2 mm.

50. The coating composition of claim 48, wherein said thickness is 0.1 mm.

* * * * *